United States Patent
Boodaghians (10) Patent No.: US 7,424,017 B2
(45) Date of Patent: *Sep. 9, 2008

(54) TECHNIQUES FOR INTRODUCING IN-BAND NETWORK MANAGEMENT PACKETS IN MULTI-PROTOCOL LABEL SWITCHING NETWORKS

(75) Inventor: Samson Boodaghians, Wayside, NJ (US)

(73) Assignee: AT&T Corp., New York, NY (US)

( * ) Notice: Subject to any disclaimer, the term of this patent is extended or adjusted under 35 U.S.C. 154(b) by 559 days.

This patent is subject to a terminal disclaimer.

(21) Appl. No.: 11/100,735

(22) Filed: Apr. 7, 2005

(65) Prior Publication Data

US 2005/0180422 A1    Aug. 18, 2005

Related U.S. Application Data

(63) Continuation of application No. 09/589,466, filed on Jun. 7, 2000, now Pat. No. 6,920,133.

(51) Int. Cl.
*H04L 12/56* (2006.01)
*H04L 12/28* (2006.01)

(52) U.S. Cl. .................. 370/389; 370/238; 370/401; 709/239

(58) Field of Classification Search ............... 370/384, 370/386, 252, 392, 399, 395.51, 466, 467, 370/351–356, 460, 401, 389, 229, 230, 236–238, 370/468, 431; 709/238–242, 201; 706/47
See application file for complete search history.

(56) References Cited

U.S. PATENT DOCUMENTS

| | | | |
|---|---|---|---|
| 6,466,985 B1 * | 10/2002 | Goyal et al. | 709/238 |
| 6,604,147 B1 * | 8/2003 | Woo | 709/240 |
| 2003/0152078 A1 * | 8/2003 | Henderson et al. | 370/389 |

* cited by examiner

*Primary Examiner*—John Pezzlo

(57) ABSTRACT

A system and method for introducing in-band network management packets (INMPs) in a Multi-Protocol Label Switching (MPLS) network. MPLS is an emerging technology, which integrates Internet Protocol (IP) routing with label switching techniques. MPLS intends to provide new capabilities in the area of traffic engineering for IP networks. These traffic engineering capabilities will have to be combined with a set of complementary operation, administration and maintenance (OA&M) functions for effectively managing and operating MPLS-based networks. This invention uses INMPs for carrying OA&M information to label switching routers (LSRs) for effectively managing and operating MPLS-based networks. This invention also includes techniques for distinguishing INMPs from user packets in an MPLS network. This invention further includes using a predetermined code in a shim header of an MPLS packet to determine whether an MPLS packet is an INMP or a user packet. The predetermined code may be provided in an experimental field or a time-to-live field in the shim header of the packet. Alternatively, a label may be reserved for distinguishing an INMP from a user packet.

22 Claims, 6 Drawing Sheets

TECHNIQUES FOR INTRODUCING IN-BAND NETWORK MANAGEMENT PACKETS IN MULTI-PROTOCOL LABEL SWITCHING NETWORKS

RELATED APPLICATIONS

This is a continuation of U.S. patent application Ser. No. 09/589,466, filed Jun. 7, 2000 now U.S. Pat. No. 6,920,133. This application is also related to U.S. patent application Ser. No. 09/589,464, also filed Jun. 7, 2000, which is hereby incorporated by reference.

FIELD OF THE INVENTION

The present invention relates generally to network operation, administration, and maintenance (OA&M) functions for communication networks. More particularly, the present invention relates to the use of in-band network management packets and corresponding techniques for distinguishing in-band network management packets from user packets.

BACKGROUND OF THE INVENTION

A typical digital communications network has a network architecture that is based upon the Open Systems Interconnection (OSI) Reference Model for providing communication between a multiplicity of interconnected digital end systems or "nodes." The OSI Reference Model divides networking protocols into seven layers, which, in ascending order of abstraction, are: 1) the physical layer, 2) the data-link layer, 3) the network layer, 4) the transport layer, 5) the session layer, 6) the presentation layer, and 7) the application layer.

Local area networks (LANs), i.e., a short-distance communications network, operate at layer 2 in the OSI model. Routers operate at layer 3 in the OSI model and may connect two LANs or other types of networks having different protocols. More specifically, routers at the network layer terminate local data-link layer protocols and utilize network layer addresses and data frame restructuring to communicate with each other.

Internet Protocol (IP) is a typical layer 3 routing protocol. For IP routing, a router receives a packet and determines a next hop, i.e., the next destination for the received packet in the path towards the final packet destination. Typically, each router in the path to the final destination of the packet analyzes the packet header for identifying the packet's destination address and runs a routing algorithm for determining the next hop towards the identified destination address.

Multi-Protocol Label Switching (MPLS) optimizes conventional routing techniques by assigning labels to a Forwarding Equivalent Class (FEC). A FEC is defined as a set of packets that can be handled equivalently for the purpose of forwarding and thus is suitable for binding to a label. Once a binding between a FEC and a label is done, it is not necessary for each label switching router (LSR) in a label-switched path (LSP), i.e., a path through one or more LSRs followed by packets having the same FEC, to analyze a received packet's IP header for determining the packet's destination address. Instead, LSRs make forwarding decisions based on the label attached to the packet, and consequently, packets are routed through the network faster.

MPLS is being developed for high-speed networks that, for example, are used by some Internet-service providers (ISPs). MPLS is currently being standardized by the MPLS Working Group of the Internet Engineering Task Force (IETF).

Figure 1:
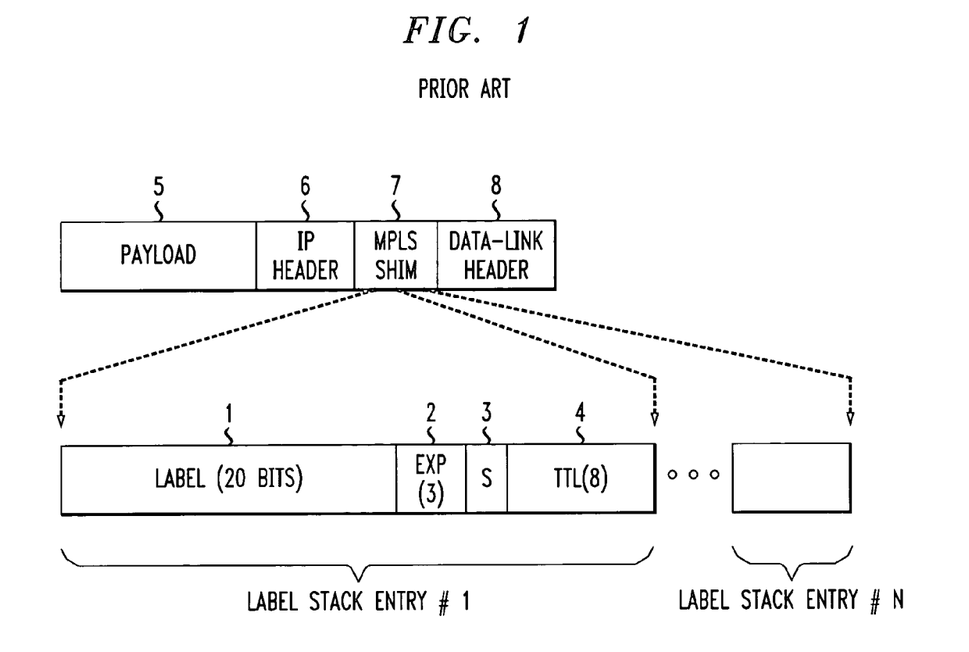
FIG. 1 is a diagram illustrating a format of a packet header used in a MPLS network.

FIG. 1 illustrates an MPLS packet having a data-link layer 8, MPLS shim header 7, network layer 6 and a payload 5. MPLS uses a shim header 7 located between a data-link layer 8 and a network layer 6 in the MPLS packet for integrating IP routing with label switching. MPLS uses the shim header 7 encapsulation shown in FIG. 1 for transporting IP Packets. MPLS can operate on any data-link layer media (e.g., ATM, FR, PPP), but MPLS currently serves only the IP client network layer. Shim header 7 generally includes a series of label stack entries. As shown in FIG. 1, a label stack entry contains a 20-bit label field 1, a 3-bit experimental field 2, a single bit field 3 indicating the bottom of the label stack and an 8-bit time-to-live (TTL) field 4.

Similar to conventional routing table entries, each LSR in a MPLS network may include a forwarding table having next hop label forwarding entries (NHLFEs). Each NHLFE, among other information, contains the physical interfaces or ports, the incoming label, and the outgoing label for the next hop for a received packet. A label in a label stack entry of a received packet is used as an index for retrieving a NHLFE containing the next hop for the received packet. Generally, the label from the label stack entry on the top of the label stack is used to index the NHLFEs in the LSR. After identifying the NHLFE for the next hop, the outgoing label for the next hop, which is retrieved from the identified NHLFE, is placed on top of the label stack for the packet, and the packet is transmitted to the next hop. This label switching technique is used by the LSRs for routing MPLS packets through the MPLS network.

Figure 2:
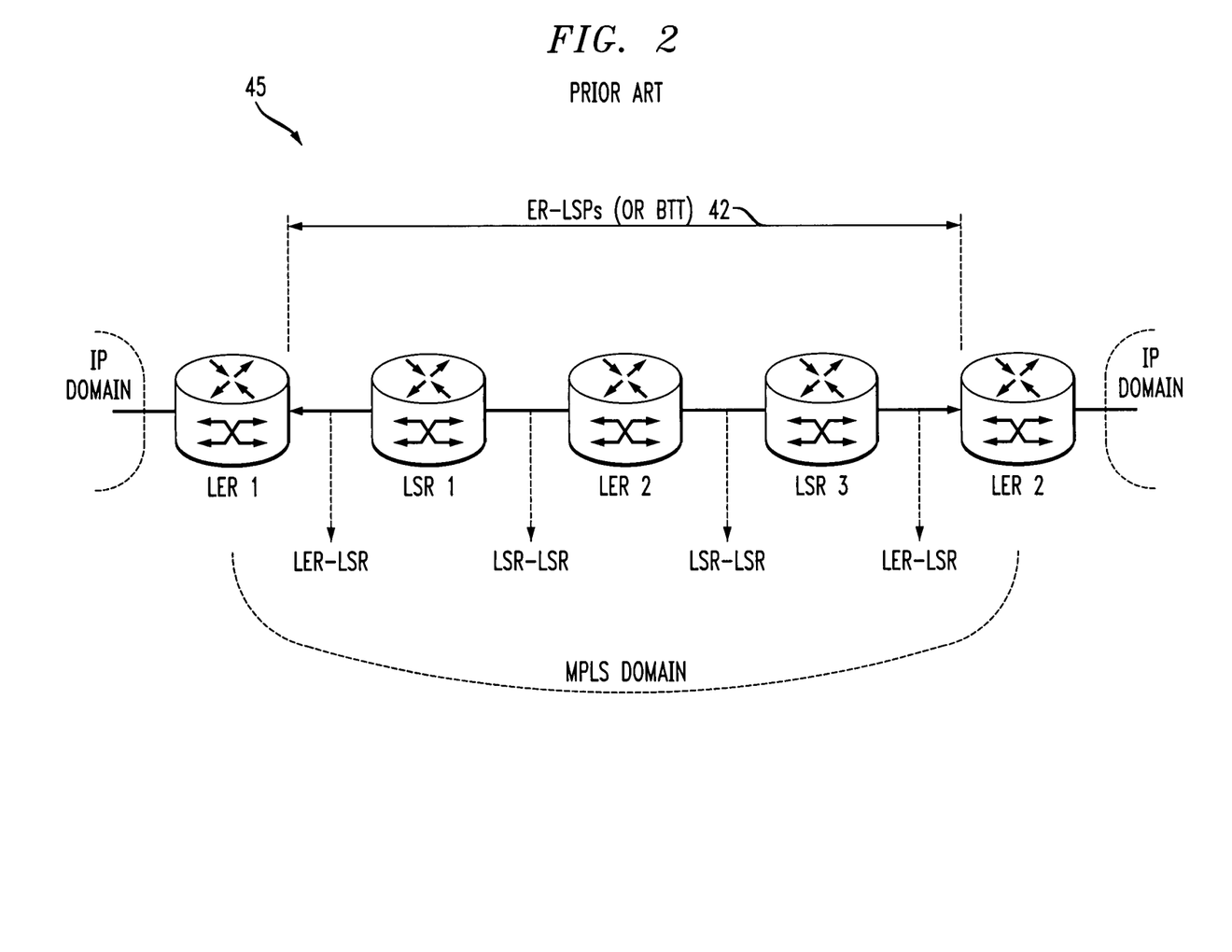
FIG. 2 is a schematic block diagram illustrating the topology of a typical MPLS network.

FIG. 2 illustrates a reference topology for a typical MPLS network 45. MPLS network 45 includes a set of nodes or LSRs for performing MPLS routing and forwarding. The LSRs in MPLS network 45 include intermediate LSRs and label-edge routers, e.g., LER 1 and LER 2. The set of contiguous nodes that an MPLS packet traverses in the MPLS network is called a Label Switched Path (LSP).

MPLS network 45 includes a bi-directional traffic engineering trunk (BTT) 42 having two traffic engineering trunks with the same endpoints, i.e., LER 1 and LER 2, and opposite directions of transmission. The two traffic trunks that form BTT 42 traverse two unidirectional explicitly routed label-switched paths (ER-LSPs) between LER 1 and LER 2. An ER-LSP is a LSP defined by a management system or a single LSR that is typically the ingress LSR for that particular direction of transmission, e.g., LER 1 or LER 2. ER-LSPs are set up independent of IP shortest path routing algorithms. BTT 42 is formed of two traffic trunks traversing two ER-LSPs in opposite directions. One traffic trunk flows downstream from ingress LER 1 towards egress LER 2 on one ER-LSP. The other traffic trunk flows upstream from egress LER 2 towards ingress LER 1 on the other ER-LSP. Consequently, BTT 42 traverses a complete round-trip path between LER 1 and LER 2.

It is envisioned that ER-LSPs, which form BTTs, will be set up for carrying possibly hundreds to several thousands of individual IP flows. Hence, it is crucial to ascertain parameters of a BTT, such as connectivity, delay and other quality of service (QoS) parameters that may effect traffic flow in the BTT.

An in-band network management packet (INMP) is a packet that carries operation, administration and maintenance (OA&M) information. INMPs can be used for testing parameters of a BTT and sending OA&M commands to an LSR. U.S. patent application Ser. No. 09/589,464, mentioned above, describes two types of INMPs, test INMPs and command INMPs. A command INMP includes an OA&M command intended for a target LSR, which is a specific LSR targeted to receive the command INMP. Once the target LSR receives the command INMP, the LSR processes the INMP, e.g., by performing the command, and the INMP is terminated. A test INMP is used for testing parameters of a BTT. For example, a test INMP, constructed by a LER, for testing delay and connectivity of a BTT may be looped around a BTT. Each LSR in the path of the BTT receives and processes the INMP, for example, by performing a set of local operations. After processing the test INMP, the LSR receiving the test INMP transmits the test INMP to a next hop on the BTT. In the case of a loopback test, after the test INMP has been looped around the BTT and once the originating LER that originally constructed the test INMP receives the test INMP, the originating LER can ascertain delay of the BTT and whether the BTT is connected. Test INMPs may be used to test connectivity, delay and other QoS parameters.

An INMP for an MPLS network uses the same shim header 7 encapsulation that is used for an MPLS packet. An INMP, in addition to a shim header that includes a label, contains a payload, hereinafter referred to as an INMP payload. The protocol and the semantic structure of the INMP payload is not defined as part of this invention but is a key component of an OA&M framework in an MPLS network. Since INMPs are constructed by the service providers'LSRs and not the end-users of the network, an MPLS client layer-independent structure for the INMP messages is envisioned. Thus, INMPs can serve any client layer protocol, including IP. The advantage of this structure is that the proposed MPLS OA&M framework will be able to support any client layer including IP.

This invention includes using INMPs for carrying OA&M data and commands in an INMP payload. The structure and complete semantics of the aforementioned INMP payload is a matter for standardization and is not discusses as an aspect of this invention. However, the semantic associated with the "Switching Label Field" in the INMP payload is discussed in the following sections as an aspect of this invention.

User data is conventionally carried in payload 5 of an MPLS packet. User data includes, for example, multimedia data (such as voice, fax, still and moving image, etc.), high-speed data or any user generated information. Therefore, if an MPLS packet is an INMP, an LSR receiving the MPLS packet must have the capability to distinguish between an INMP and a user MPLS packet. For example, if a received MPLS packet is a user packet (i.e, a packet that contains user data in payload 5, the LSR receiving the packet simply determines the next hop for the packet and transmits the packet to the next hop without the need to read payload 5. However, if the packet is an INMP, the receiving LSR must read and process OA&M information in the INMP payload.

Hence, a need exists for providing LSRs with the capability to determine whether an MPLS packet is an INMP or a user packet.

SUMMARY OF THE INVENTION

It is an aspect of the present invention to use INMPs for conveying OA&M information in an MPLS network. It is another aspect of the present invention to use different fields of the MPLS header for distinguishing INMPs from user data.

In accordance with the present invention, there is provided a system and method for distinguishing an INMP packet from a user packet. In accordance with the present invention, a predetermined 3-bit code in the EXP field of the MPLS header is used to determine whether the received packet is an INMP or a user packet. In another preferred embodiment of the present invention a predetermined 1-bit code in the EXP field of the MPLS header is used to determine whether the received packet is an INMP or a user packet.

Alternatively, in accordance with the present invention a predetermined code in the TTL field is used to determine whether the received packet is an INMP or a user packet.

Alternatively, in accordance with the present invention, a label (i.e., a reserved label) is designated and used to determine whether a received packet is an INMP or a user packet. Using a reserved label requires modification to conventional label switching techniques, because the reserved label is inserted in the top layer of the shim header label stack where the switching label (i.e., the label used to determine the next hop) is normally located. Thus, in accordance with, the present invention, a reserved label is inserted on top of a label stack in a shim header in a packet, and a label below the reserved label on the label stack is used to determine the next hop for the packet. Alternatively, the reserved label is inserted in a shim header of a packet, whereas the switching label is inserted in a designated field in the INMP payload.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

1. Experimental Field (or EXP Bits)

Figure 3:
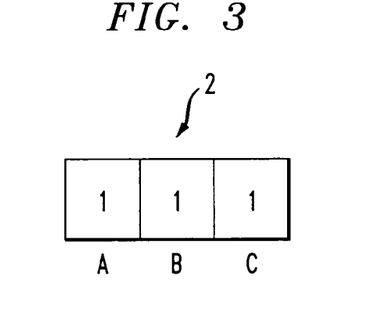
FIG. 3 is a diagram of an EXP field in an MPLS shim header.

EXP field 2 in shim header 7 has a length of three bits. FIG. 3 illustrates EXP field 2 having three bits A-C, bit A being the most significant bit and bit C being the least significant bit. Currently, the use for the EXP bits is not standardized, but there is a proposal to use the EXP bits for signaling class of service (CoS). For example, an LSR includes a plurality of queues for temporarily storing received MPLS packets that need to be routed. The MPLS packets are placed on different queues as they are ready to exit a port on the LSR. MPLS packets in the higher priority queue (e.g., the queue designated for high CoS packets) are served before the remaining packets in other queues, which contain packets of lower CoS. Alternatively, each queue can be given a share of the LSR port and line bandwidths, which is proportional to its CoS designation as compared to other queues. Since there are three bits in EXP field 2, up to eight classes can be designated.

In a preferred embodiment of the present invention, a bit in EXP field 2, hereinafter referred to as an INMP ID bit, is designated to carry coded information for differentiating INMPs from user packets. For example, bit A in EXP field 2 is designated as the INMP ID bit, and an INMP ID bit having a value of "1" identifies an INMP. One of ordinary skill in the art, however, can readily designate any one of bits A-C as the INMP ID bit, and an INMP ID bit having a value of "0" may also be used for identifying an INMP. An LSR receiving an MPLS packet with bit A in EXP field 2 having a value of "1" determines from bit A that the received MPLS packet is an INMP. After making this determination, the LSR processes the INMP to, e.g., test a parameter of the BTT or perform a command, as discussed above.

In another preferred embodiment, a predetermined 3-bit code carried in EXP field 2, hereinafter referred to as an INMP ID code, identifies an INMP. For example, "111" in EXP field 2 is designated as the INMP ID code, and an LSR receiving an MPLS packet having "111" in EXP field 2 determines that the received packet is an INMP. One of ordinary skill in the art, however, can readily designate any 3-bit code for the INMP ID code.

As discussed above, there is a proposal to use the EXP bits for designating CoS for the MPLS packet. Designating an INMP ID code limits the number of classes that may be designated from eight to seven, because one of the eight codes is allocated as an INMP ID code. Also, designating an INMP ID bit limits the number of classes that may be designated from eight to four, because one bit from EXP field 2 is allocated as an INMP ID bit. In many networks, however, up to four classes may be adequate, so allocating a code or a bit in EXP field 2 for identifying an INMP can be acceptable.

Figure 4:
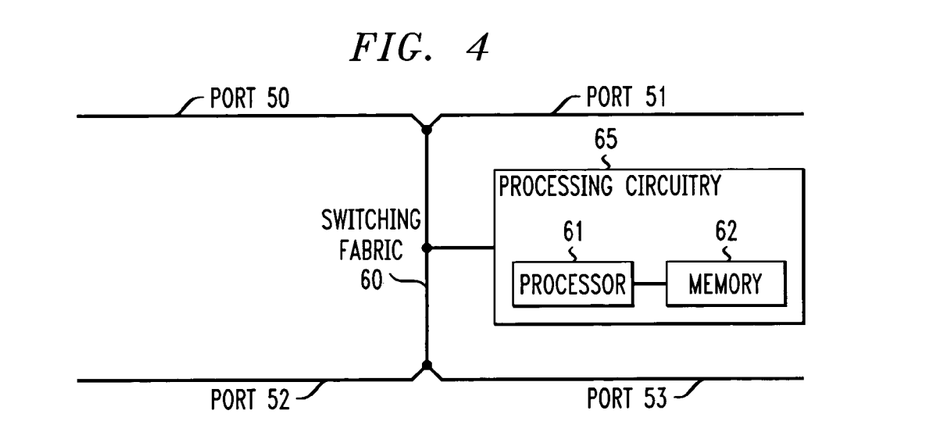
FIG. 4 is a schematic block diagram of a label switched router of the present invention.

FIG. 4 is a schematic block diagram of a preferred embodiment of an LSR in MPLS network 40. The LSR shown in FIG. 4 includes ports 50-53, processing circuitry 65 and switching fabric 60. Each of ports 50-53 includes transmitting circuitry, receiving circuitry and packet assembly circuitry, as is known in the art. Ports 50-53 are connected to processing circuitry 65 through switching fabric 60. The switching fabric, for example, may be a high-speed bus and include one or more multiplexors and de-multiplexors. Processing circuitry 65 includes a processor 61 and memory 62. Processor 61, may include a high-speed processor and performs forwarding/routing functions. Memory 62 may include, among other information, NHLFEs stored, for example, in a table or database for determining a next hop.

Typical operation of the LSR shown in FIG. 4 may include receiving incoming packets at ports 50-53. Packet information from the incoming packets is sent to processing circuitry 65 through switching fabric 60. Processing circuitry 65 processes the packet information to determine the next hop for an incoming packet. For example, processing circuitry 65 can identify an incoming label for each packet, and retrieve an NHLFE corresponding to the incoming label from a table stored in memory 62. The retrieved NHLFE contains the label for the next hop. Then processing circuitry 65 forwards the packet information with the new label through switching fabric 60 to the port associated with the next hop. The packet information is assembled into an outgoing packet. The outgoing packet is then transmitted to the next hop.

Figure 6:
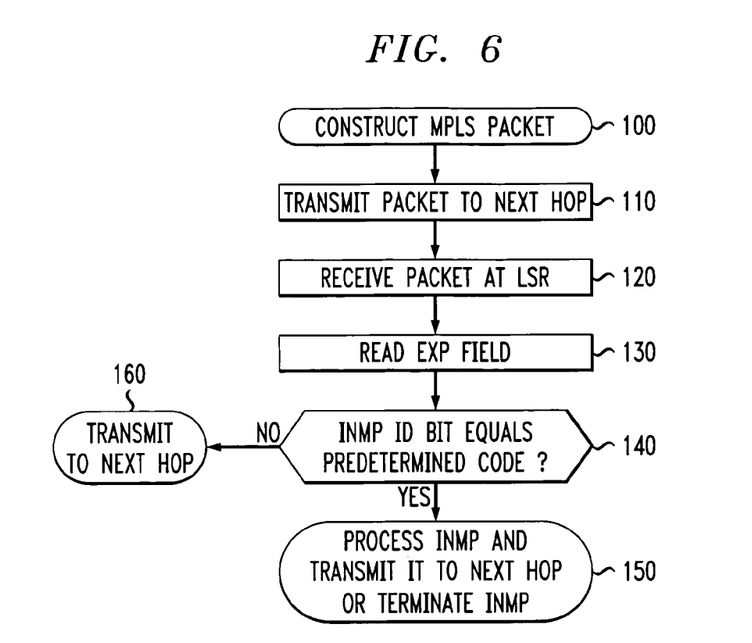
FIG. 6 is a flow diagram of a preferred embodiment of the present invention that uses an INMP ID bit.

FIG. 6 illustrates a flow diagram of the preferred embodiment of the present invention that uses an INMP ID bit for identifying an INMP. In step 100, LER 1 constructs an MPLS INMP having a payload for conveying OA&M information, and LER 1 inserts the INMP ID code in shim header 7. Any LER, such as LER 2, however, may construct an MPLS INMP. In step 110, LER 1 transmits an MPLS packet on a traffic trunk, such as BTT 42, to LSR 1, i.e., the next hop on BTT 42 downstream. In step 120, LSR 1 receives the MPLS packet on, for example, port 50. The packet information is forwarded to processing circuitry 65. In step 130, processing circuitry 65 reads the MPLS packet header, including EXP field 2 in shim header 7. In step 140, processing circuitry 65 identifies the INMP ID bit from EXP field 2. In step 140, processing circuitry 65 compares the INMP ID bit with a predetermined code, such as "0" or "1". If the INMP ID bit equals the predetermined code, the processing circuitry identifies the packet as an INMP. If the INMP ID bit equals the predetermined code, in step 150, processing circuitry 65 processes the INMP, and the packet is transmitted to the next hop. In step 100, the constructed MPLS packet is an INMP, and thus, in step 140, the INMP is processed. Processing the INMP, for example, may include determining whether the INMP is a test INMP or a command INMP and testing a parameter of the BTT or processing the command and terminating the INMP if the INMP is a command INMP. If the INMP ID bit is not equal to the predetermined code, in step 160, processing circuitry 65 determines a next hop, using a NHLFE, for the received packet and the MPLS packet is label-switched to LSR 2, i.e., the next hop on BTT 42.

Figure 7:
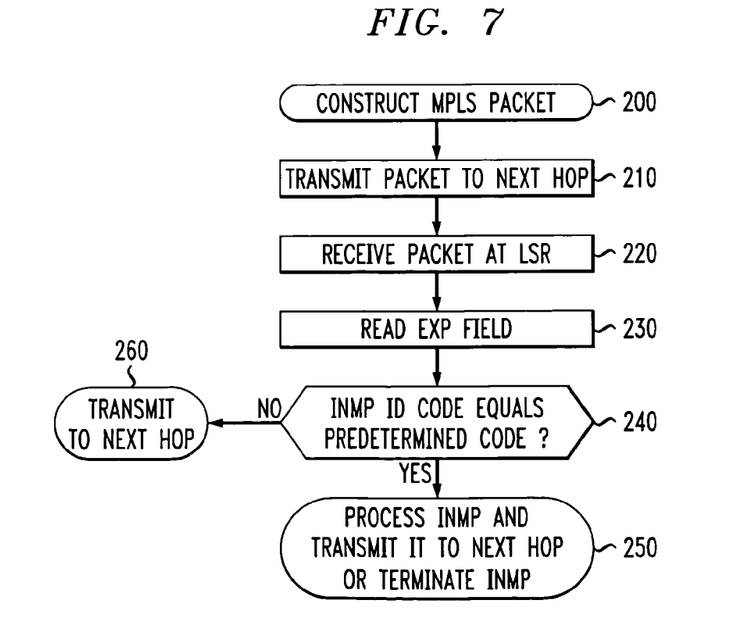
FIG. 7 is a flow diagram of a preferred embodiment of the present invention that uses an INMP ID code.

FIG. 7 illustrates a flow diagram of the preferred embodiment of the present invention that uses an INMP ID code for identifying an INMP. The steps are substantially the same as those shown in FIG. 6 for the preferred embodiment using an INMP ID bit, except the INMP ID code is compared to a predetermined code.

2. Time-to-Live Field

Currently, the one octet TTL field in MPLS shim header 7 is used in the same manner as the TTL field in IP header 6. That is, the IP TTL field is copied into the MPLS header TTL field upon a packet's entry into MPLS network 45. The MPLS header TTL field is then decremented by one as the MPLS packet traverses each LSR towards its final destination. If the TTL field becomes zero, the packet is discarded since that is a strong indication that the MPLS packet is routed in an endless routing loop among LSRs in MPLS network 45.

Figure 5:
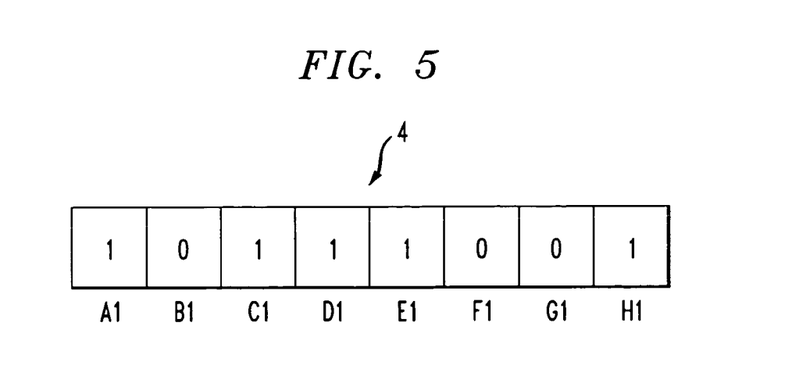
FIG. 5 is a diagram of a TTL field in an MPLS shim header.

In another preferred embodiment of the present invention, TTL field 4 can be used to code information to distinguish INMPs from user packets. In this preferred embodiment, a single bit from TTL field 4, hereinafter referred to as a TTL ID bit, is designated as a flag to differentiate an INMP from a user packet, similarly to an INMP ID bit in EXP field 2. TTL field 4 is shown in FIG. 5 with A1 as the most significant bit. Bit A1 in TTL field 4 is designated as the TTL ID bit, and the TTL ID bit having a value of "1" identifies an INMP. One of ordinary skill in the art, however, can readily designate any one of bits A1-H1 as the TTL ID bit, and a TTL ID bit having a value of "0" may also be used for identifying an INMP. An LSR receiving an MPLS packet with bit A1 in TTL field 4, having a value of "1", determines from bit A1 that the received packet is an INMP. After determining that the packet is an INMP, the LSR processes the INMP.

Designating a bit in the TTL field for distinguishing INMPs from user data limits the number of hops a packet can traverse to 128 hops (i.e., 2 to the power of 7) before it is discarded. However, 128 hops is a more than adequate threshold for discarding packets routed in an endless loop. Also, similar to the INMP ID code, an 8-bit TTL code may be designated and used to determine whether a received packet is an INMP or a user packet.

In Hop-by-hop MPLS, where the LSPs are formed using IP routing algorithms, the TTL field is necessary since the potential for routing loops exits. In explicitly routed LSPs (ER-LSPs) since the routes are calculated independent of IP routing algorithms, the TTL field may not be necessary since the potential for routing loops can be eliminated. However, the network will still have to keep track of the TTL as if the packet has traversed an IP network. In other words, when the packet emerges from the MPLS domain and into another MPLS or IP domain, it must contain the correct TTL value. This situation where the TTL field is not available to decrement, occurs in ATM and FR MPLS networks. This is because ATM and FR layer 2 headers do not include a TTL field. In latter cases, the Label Distribution Protocol (LDP) utilizes the Hop-Count variable to pre-calculate the hop count associated with an LSP. At the egress LER, this Hop-Count is then subtracted from the original TTL value of the packet (i.e., the TTL value of the packet upon entry into the MPLS domain).

When the INMP ID code method is used to identify an INMP, the TTL field in not available to decrement. Therefore, the aforementioned Hop-Count method can be used for processing the TTL field upon exiting the MPLS domain.

Figure 8:
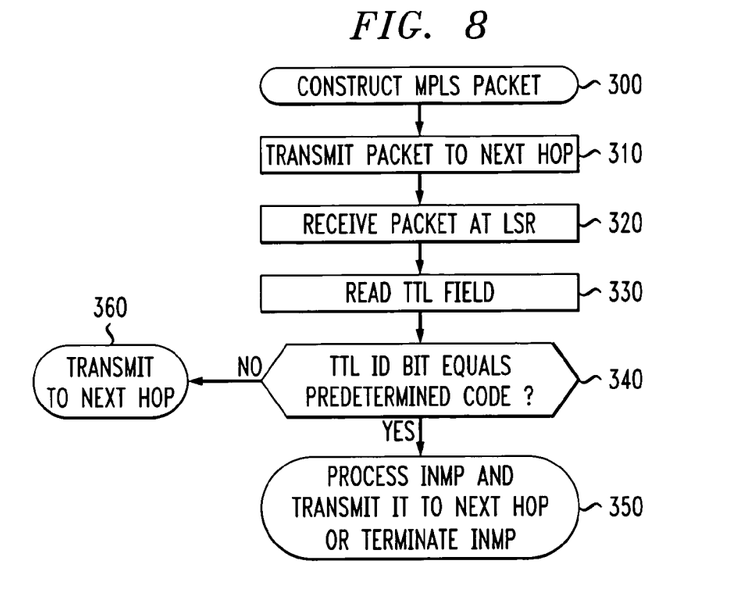
FIG. 8 is a flow diagram of a preferred embodiment of the present invention that uses the TTL field.

FIG. 8 illustrates a flow diagram of the preferred embodiment of the present invention that uses a TTL ID bit for identifying an INMP. In step 300, LER 1 constructs an MPLS INMP having a payload for conveying OA&M information, and inserts the TTL ID bit in shim header 7. Any LER, however, may construct the MPLS INMP, such as LER 2. In step 310, LER 1 transmits an MPLS packet on a traffic trunk, such as BTT 42, to LSR 1, i.e. the next hop on BTT 42 downstream. In step 320, LSR 1 receives the MPLS packet on, for example, port 50. The packet information is forwarded to processing circuitry 65. In step 330, processing circuitry 65 reads the MPLS packet header, including TTL field 4 in shim header 7. In step 340, processing circuitry 65 identifies the TTL ID bit from TTL field 4, and processing circuitry 65 compares the TTL ID bit with a predetermined code, such as "0" or "1". If the TTL ID bit equals the predetermined code, the processing circuitry identifies the packet as an INMP. If the TTL ID bit equals the predetermined code, in step 350, processing circuitry 65 processes the INMP. In step 300, the constructed MPLS packet is an INMP, and thus, in step 350, the INMP is processed. Processing the INMP, for example, may include determining whether the INMP is a test INMP or a command INMP and transmitting the INMP to a next hop if the INMP is a test INMP or performing the command and terminating the INMP if the INMP is a command INMP. If the INMP ID bit is not equal to the predetermined code, in step 360, processing circuitry 65 determines that the packet is a user packet. Then, processing circuitry 65 determines the next hop, using a NHLFE, and the MPLS packet is label-switched to its next hop.

3. Reserved Label

An MPLS packet is transported on an LSP using the existing label-switching technique described above. For example, an LSR in network 45 receiving an MPLS packet determines the next hop for the received packet using a label from the top of the label stack. A label, however, may be reserved for identifying an INMP (i.e., distinguishing an INMP from a user packet). The reserved label is a specific label that identifies an INMP, and thus, the reserved label can be used to distinguish an INMP from a user packet.

Using the reserved label requires some enhancements to the existing label-switching methods to support transport of INMPs. In a preferred embodiment of the present invention, a label stack entry including a reserved label is inserted on top of the label stack, and the switching label is inserted in a label stack entry directly below the reserved label. Once an LSR identifies the reserved label, the LSR maintains the reserved label on top of the label stack, but the LSR label-switches using the switching label in the label stack entry immediately below the reserved label.

Figure 9:
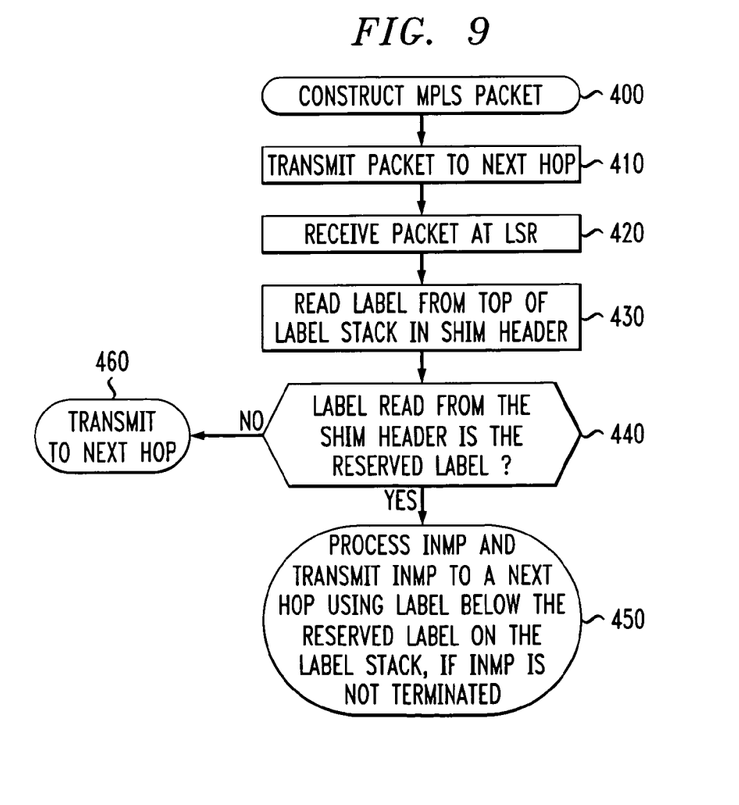
FIG. 9 is a flow diagram of a preferred embodiment of the present invention that uses a reserved label.

FIG. 9 illustrates the preferred embodiment of the present invention that maintains the reserved label on top of the label stack. In step 400, ingress LER 1 constructs an INMP having an INMP payload for conveying OA&M information. LER 1 then inserts the reserved label on top of the label stack in shim header 7. Note that the label normally used for switching (i.e., the switching label) now resides immediately below the aforementioned reserved label. In step 410, LER 1 transmits the INMP on BTT 42 to LSR 1, i.e., the next hop downstream on BTT 42, using the switching label. Any LER, however, may construct the INMP, and the INMP may be transmitted on a unidirectional traffic trunk as well as a bi-directional traffic trunk. In step 420, LSR 1 receives the INMP on, for example, port 50. The packet information is forwarded to processing circuitry 65. In step 430, processing circuitry 65 reads the label from the top of the label stack in shim header 7. In step 440, processing circuitry 65 determines whether the label is the reserved label. If the label read from the top of the label stack is the reserved label, the processing circuitry identifies the received packet as an INMP. In step 450, if the label read from the top of the label stack is the reserved label, processing circuitry 65 processes the INMP. In step 400, the constructed MPLS packet is an INMP, and thus, in step 450, the INMP is processed. Processing the INMP, for example, may include determining whether the INMP is a test INMP or a command INMP and transmitting the INMP to a next hop if the INMP is a test INMP or performing the command and terminating the INMP if the INMP is a command INMP. In step 450, if the INMP is not terminated, processing circuitry 65 determines the next hop for the received packet using a label in a label stack entry directly below the reserved label, which is on top of the label stack. The INMP is then transmitted to the identified next hop using the label directly below the reserved label. In step 460, if the label on top of the label stack is not the reserved label, processing circuitry 65 determines the next hop for the received packet using the label from the top of the label stack.

In another preferred embodiment of the present invention, a reserved label is carried in a label stack entry in shim header 7, and a field called the "switching label field" in the INMP payload is designated for carrying the switching label. In this embodiment, like the previously described embodiment, the reserved label is carried in a label stack entry in shim header 7. However, in this preferred embodiment, the LSR receiving the INMP determines the next hop using a switching label carried in a field in the INMP payload of the received INMP. For example, the INMP payload may be partitioned into a plurality of fields, and one of the fields may be designated for carrying the switching label. Currently, the protocol and semantic structure of an INMP payload is not determined, and one of ordinary skill in the art may designate a field for carrying the switching label when the protocol and complete semantic structure of the INMP payload is standardized.

Figure 10:
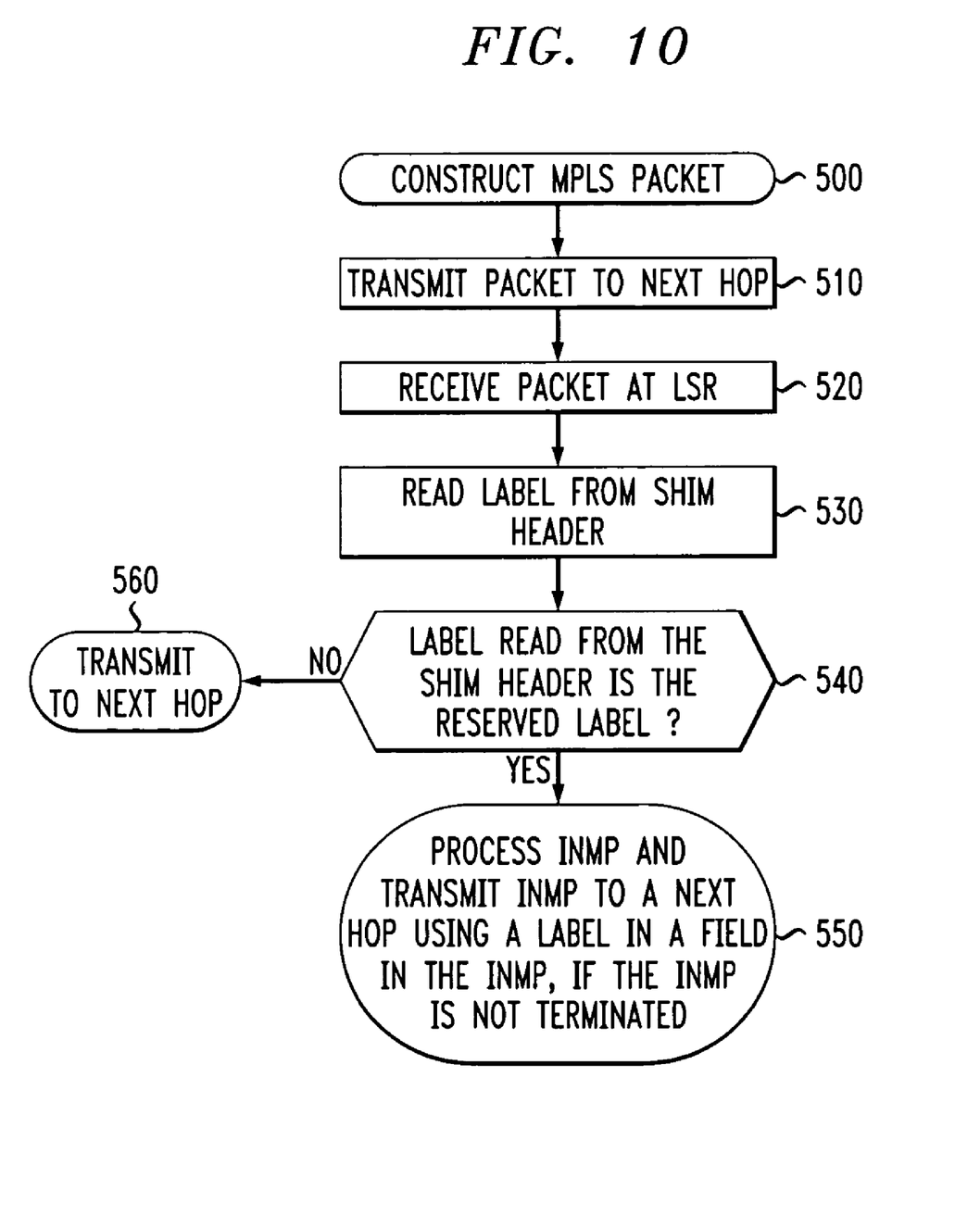
FIG. 10 is a flow diagram of another preferred embodiment of the present invention that uses a reserved label.

FIG. 10 illustrates the preferred embodiment of the present invention that carries the switching label in a field in an INMP payload. In step 500, ingress LER 1 constructs an INMP having the reserved label in a label stack entry in shim header 7. In step 510, LER 1 transmits the INMP on BTT 42 to LSR 1, i.e., the next hop on BTT 42 downstream. Any LER, however, may construct the INMP and the INMP may be transmitted on a unidirectional as well as a bidirectional traffic trunk. In step 520, LSR 1 receives the INMP on, for example, port 50. The packet information is forwarded to processing circuitry 65. In step 530, processing circuitry 65 reads the label from shim header 7. In step 540, processing circuitry determines whether the label is the reserved label. If the label read from a shim header 7 is the reserved label, the processing circuitry identifies the packet as an INMP. In step 550, if the label read from a shim header 7 is the reserved label, processing circuitry 65 processes the INMP. Processing the INMP, for example, may include determining whether the INMP is a test INMP or a command INMP and transmitting the INMP to a next hop if the INMP is a test INMP or performing the command and terminating the INMP if the INMP is a command INMP. In step 500, the constructed MPLS packet is an INMP, and thus, in step 550, the INMP is processed. Then, in step 550, processing circuitry 65 determines the next hop for the received packet using a switching label in a field in the INMP payload in the received packet. Processing circuitry 65 can either swap the switching label in this field with the outgoing label identified by the retrieved NHFLE, or processing circuitry 65 can append the outgoing label to the previously appended switching label(s) in the designated field in the INMP payload. With the latter approach a label trace of the INMP is maintained in the designated field of the INMP payload. The reserved label is maintained in shim header 7. In step 560, if the label in shim header 7 is not the reserved label, processing circuitry 65 determines the next hop for the received packet using the label on top of the label stack in shim header 7.

The present invention is applicable to Internet backbones and enterprise networks, which use MPLS as a transport mechanism. In addition, some aspects of the present invention can be implemented for ATM, Frame Relay, and optical networks utilizing label-switching techniques.

What has been described are the preferred embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A method of introducing in-band network management packets in a network comprising steps of:
   constructing a packet including an IP header field, at least one additional header field, and a packet data field;
   inserting a predetermined code in a field of said one additional header field, which code differentiates between a packet that is an in-band network management packet and a user packet; and
   providing the constructed packet to said network.

2. The method of claim 1, wherein the network is an MPLS network, and the code is inserted into a subfield of a field of said one additional header field that is used to supply a routing label for said MPLS network (MPLS shim field).

3. The method of claim 2, wherein the predetermined code is a three-bit code.

4. The method of claim 3, wherein the predetermined code is a one-bit code.

5. The method of claim 1, wherein the field for inserting the predetermined code indicates class of service for the packet when the packet is a user packet.

6. The method of claim 2 wherein the subfield for inserting the predetermined code is a time-to-live subfield.

7. The method of claim 2 where the subfield is the EXP subfield.

8. The method of claim 1, wherein the field of said one additional header field is the shim header field of MPLS user packets.

9. A method of employing in-band network management packets in a multi-protocol label switching network, comprising the steps of:
   subjecting a packet that includes a data field, an IP header field, and one or more additional header fields to a determination that concludes that said packet is an in-band network management packet when a predetermined code is present in a predetermined one of said additional header fields field of said packet, and concludes tat said packet is a user packet otherwise, and
   responding to command included in the packet when said determination concludes that the packet is an in-band network management packet.

10. The method of claim 9, wherein the packet is a multi-protocol label switching packet.

11. The method of claim 2 where said code is designated as a preselected network management label, and is inserted in a label subfield of the shim field.

12. The method of claim 11, further including steps of:
    inserting the preselected network management label on top of a label; and
    determining a next hop for the packet using a label on the label stack below the preselected network management label that is at the top of the stack.

13. The method of claim 1 wherein the constructed packet includes a data payload field that supplies information relative to the in-band network management function to be performed by the packet.

14. A network comprising:
    an originating router constructing an in-band network management packet that includes a data field, an IP header field, and one or more additional header fields, where a code that designates a packet as an in-band network management packet is found in one of the additional header fields; and
    a receiving router that receives a packet and determines whether the packet is an in-band network management packet or a user packet by ascertaining whether said code is present in said packet.

15. The network of claim 14, wherein the constructed packet is a multi-protocol label switching packet.

16. The network of claim 14, wherein the network is a multi-protocol label switching network.

17. The network of claim 15, wherein the code is a reserved label in a header in the packet that is devoted to containing a label of said multi-protocol label switching packet.

18. A router comprising:
    reception circuitry that receives an incoming packet that includes a data field, an IP header field, and one or more additional header fields;
    processing circuitry that identifies value of a code in a preselected one of said one or more additional header fields; and
    determines whether the incoming packet is an in-band network management packet or a user packet based on the identified value.

19. The router of claim 18, wherein the processing circuitry identifies the predetermined code from a preselected subfield of a header field of the incoming packet that is devoted to providing a routing label of the incoming packet.

20. The router of claim 18, wherein the predetermined code is any one of a one-bit and three-bit code.

21. The router of claim 18, wherein the constructed packet is a multi-protocol label switching packet.

22. The muter of claim 18, interconnected to a multi-protocol label switching network.

* * * * *